3,000,727
SEPARATION OF IRON IMPURITY FROM COBALT-BEARING SOLUTIONS

Raphael F. Matson, New Orleans, La., assignor to Freeport Sulphur Company, New York, N.Y., a corporation of Delaware
No Drawing. Filed Jan. 27, 1958, Ser. No. 711,173
10 Claims. (Cl. 75—108)

This invention relates to processes for the separation of iron impurities from cobalt-bearing solutions and more particularly to the purification of acidic aqueous cobalt-bearing solutions containing small amounts of iron at least a part of which is in the divalent state.

A number of processes have been suggested and described in the prior art for the recovery of cobalt, nickel and other valuable metals from various ores containing iron in addition to said valuable metals involving selective leaching of the valuable metal by the action of acids in aqueous solution. Although these processes accomplish very substantial selective dissolution or concentration of the valuable metal content, the product liquors containing the dissolved salts of the valuable metals (e.g. the sulfates and chlorides of cobalt and nickel) invariably also contain a small amount of iron as an impurity.

It has also been suggested that these product liquors containing this iron impurity be treated for the separation of the iron by lowering the hydrogen ion concentration through the addition of an alkali to a level which causes selective precipitation of iron, that is to a level of from 3.5 to 5 after which the treated liquor is filtered or otherwise treated for the removal of the iron precipitate. This process, however, removes only a portion of the iron impurity.

Analytical examinations of the metal compounds contained in the product liquors hereinbefore described reveal that the iron impurity is present in both the divalent state and in the trivalent state. An increased proportion of the iron can be removed from acidic cobalt and nickel product liquors by raising the pH of the solution to a value of 5, or more, next introducing air and then filtering, but this oxidation procedure causes a considerable amount of the cobalt and nickel to co-precipitate with the iron, which mixed precipitate is not economically amenable to treatment accomplishing separation of iron from the cobalt and nickel.

The ultimate object of the present invention is to provide a process for treating the acidic aqueous solutions of cobalt salts generally in admixture with salts of nickel and other valuable metals, having iron impurities by which all of the iron, practically considered, is removed without coprecipitation of cobalt or nickel.

An immediate object of the invention is to provide an efficient and relatively simple process for converting the divalent iron impurity in cobalt- and nickel-bearing leach liquors into the trivalent state such that all of the iron can be selectively precipitated from the total valuable metal content simply by decreasing the hydrogen ion concentration to the level of 3.5 to 5 pH value.

Broadly considered, the invention may be described as a process for the separation of iron impurity from acidic aqueous solutions of cobalt compounds, or of cobalt and nickel compounds, containing iron at least in part in divalent form which involves adding cobaltic pentammine to such solution in a quantity sufficient to oxidize the divalent iron, or more precisely a quantity at least stoichiometrically equivalent to the amount of divalent iron present in the solution, reacting said pentammine with said divalent iron and selectively precipitating the iron impurity from the cobalt by adjusting to or maintaining the hydrogen ion concentration of such solution at a pH value of 3.5–5.

In accordance with a preferred procedure, the acidic solution containing the cobalt and the iron impurity is first heated to a temperature adapted to speed up the pentammine-iron reaction, then the cobaltic pentammine is added and oxidation of the divalent iron commences, next the hydrogen ion concentration of the solution is adjusted to the above-mentioned level of pH value whereupon precipitation of all of the iron from the solution soon takes place and finally, the precipitated iron is separated from the solution as by filtration, thereby obtaining (1) a substantially iron-free, cobalt-bearing solution from which a substantially pure cobalt product may be readily recovered, and (2) an iron precipitate virtually free of nickel and cobalt.

For efficiently accomplishing the oxidation reaction of the invention, the impure cobalt-containing solution should be heated to a temperature of at least about 170° F. and preferably to about 185° F. Heating to this temperature provides a rapid rate of reaction and causes the iron impurity (oxides and hydroxides) to coagulate effectively thus facilitating filtration. Heating to temperatures above about 200° F. leads to little additional benefit, if any. Theoretically the amount of cobaltic pentammine to be added to the cobalt solution should be stoichiometrically equivalent to the amount of ferrous iron present therein. However, in actual practice it is preferable to add a slight excess of the pentammine to insure the oxidation of all of the ferrous iron. Through this addition the recovery of a substantially pure cobalt product is assured.

When the cobaltic pentammine reacts with the ferrous iron, ammonia is released, and if the cobalt solution containing the ferrous iron is not sufficiently acidic at the outset, the release of the ammonia will raise the pH value of the solution to a level above the operable range for effecting selective precipitation of the iron in accordance with the practice of the present invention. Therefore, if the cobalt-bearing solution is not sufficiently acid initially, sulfuric or other acid may be added thereto in order to insure that the action of the cobaltic pentammine will not cause the pH value to rise to a level as high as 5, and preferably to about pH 4.

If the hydrogen ion concentration of the impure cobalt containing solution is below a pH of about 4, anhydrous or concentrated aqueous ammonia is preferably added to the solution during continuous agitation thereof, this agitation serving to eliminate any localized adjustment to a pH value above 5 at which level precipitation of cobalt and any nickel present will occur. Though ammonia is the most convenient alkali to employ, alkali metal and alkaline earth metal hydroxides may be alternatively used. The alkali may be added in small amounts from time to time during the oxidation-precipitation reaction in such manner as to maintain the pH value between 3.5 and 5. At lower pH values, little if any oxidation and precipitation of the iron will take place whereas at pH values greater than 5 the cobalt or cobalt and nickel will be precipitated along with the iron and defeat the selective precipitation feature of the invention.

The reaction of the pentammine with the ferrous iron and the precipitation of all of t he iron impurity will ordinarily be accomplished in about 15 minutes. After this period the reaction mass is filtered, decanted or otherwise treated for the separation of the iron precipitate. The iron-free liquor obtained in this manner may be processed by any of the several known recovery processes to separate the cobalt and nickel values.

Although the invention is particularly applicable to acid product liquors obtained by the leaching of cobalt-nickel limonitic ores and their sulfide concentrates, it is generally applicable to acidic solutions of cobalt compounds or cobalt and nickel compounds of a pH value below 5 containing relatively small amounts of iron as an impurity, some of which iron is present in the divalent state. The process can be successfully applied to acidic solutions of cobalt compounds in the form of sulfates, chlorides, acetates and phosphates and to salts of other non-oxidizing acids. Leach liquors containing as little as 0.004 g.p.l. of ferric iron and 0.002 g.p.l. of ferrous iron can be advantageously treated. When the leach liquor contains iron only in the divalent state, the process of the invention may be economically employed if the liquor contains as little as 0.005 g.p.l. of ferrous iron.

The invention is applicable to leach liquors containing very wide ratios of cobalt to iron and nickel to iron. Typically the leach liquors to which the invention is applicable contain cobalt to iron in a ratio of about 25 to 1 and nickel to iron in a ratio of about 250 to 1. The process, however, has been found applicable to leach liquors wherein the cobalt to iron ratio varies between about 1000:1 and 5:1 and where the nickel to iron ratio varies between about 10,000:1 and 25:1. The invention thus appears to be applicable to leach liquors and solutions of any ratio of the components which will be encountered in industrial operation.

*Example*

An acid liquor obtained in known manner by the oxidation leaching of a sulfide concentrate of a nickeliferous, lateritic, limonite ore, which concentrate is obtained by sulfuric acid leaching and hydrogen sulfide precipitation, containing, in grams per liter, 54.8 nickel, 5.36 cobalt, 0.130 total iron of which 0.063 was ferrous iron, 0.013 aluminum and 16.3 free sulfuric acid was heated to 185° F., whereupon cobaltic pentammine was added in an amount stoichiometrically equivalent to the ferrous iron present therein. Concentrated ammonia was then added drop-wise to the solution during agitation, until a pH of 4 was obtained. The solution was maintained at this pH value for about 15 minutes and thereafter it was filtered to separate the precipitated iron. Analysis of the filtrate showed that substanially all of the iron and aluminum had been removed.

The present invention has an advantage in the simplicity with which the iron initially in the divalent state is removed along with the trivalent iron in a single precipitation step. The only reagent employed is cobaltic pentammine and the cobalt of this reagent is recovered in the form of substantially pure metal together with the cobalt extracted from the ore. Thus the cost of the cobaltic pentammine in the operation of the process of the invention is relatively small.

It should be understood that the present invention is not limited to the specific details as to conditions or procedures herein disclosed but that it extends to all equivalents which will occur to those skilled in the art upon consideration of the scope of the claims appended hereto.

I claim:

1. In the separation of iron impurity from acidic cobalt-bearing aqueous solutions wherein the iron is selectively precipitated by adjusting the hydrogen ion concentration of the solution to a level at which such precipitation takes place, the improvement in which the ferrous iron as well as any ferric iron impurity present in the solution is separated which comprises, oxidizing the ferrous iron impurity in said solution by reacting the same with cobaltic pentammine before the selective precipitation treatment is completed.

2. A process for the separation of iron impurity from acidic aqueous solutions of cobalt salts containing iron at least in part in divalent form, which comprises adding cobaltic pentammine to said solution in a quantity substantially equivalent to the divalent iron content of the solution, reacting said pentammine with said iron and selectively precipitating the iron impurity from the cobalt by maintenance of the hydrogen ion concentration of the solution at a pH value of 3.5–5.

3. A process for the separation of iron impurity from acidic aqueous solutions of cobalt salts containing iron at least in part in divalent form, which comprises heating the solution to a temperature of at least about 170° F., adding cobaltic pentammine to said solution in a quantity substantially equivalent to the divalent iron content of the solution, maintaining the pH value of the solution within the range of 3.5 to 5 until the pentammine has reacted with the ferrous iron and the iron impurity has been precipitated.

4. A process for the separation of iron impurity from acidic aqueous solutions of cobalt salts containing iron at least in part in divalent form, which comprises heating the solution to a temperature of at least about 170° F., adding cobaltic pentammine to said solution in a quantity substantially equivalent to the divalent iron content of the solution, adjusting the hydrogen ion concentration of the solution by the addition of an alkali to a pH value of from 3.5 to 5, and when the iron content has been substantially wholly precipitated, separating the remaining solution containing the cobalt from said precipitate.

5. A process for the separation of iron impurity from a product liquor solution obtained in a process involving the sulfuric acid leaching of cobalt- and nickel- containing lateritic, limonite ore, which comprises adding cobaltic pentammine to said solution in a quantity substantially equivalent to the divalent iron content of the solution, reacting said pentammine with said iron and selectively precipitating the iron impurity from the cobalt and nickel by maintenance of the hydrogen ion concentration of the solution at a pH value of 3.5–5.

6. A process for the separation of iron impurity from a product liquor solution obtained in a process involving the sulfuric acid leaching of cobalt- and nickel- containing lateritic, limonite ore, which comprises, heating the solution to a temperature of at least about 170° F., adding cobaltic pentammine to said solution in a quantity substantially equivalent to the divalent iron content of the solution, maintaining the pH value of the solution within the range of 3.5 to 5, and when the iron content has been substantially wholly precipitated, separating the remaining solution containing the cobalt and nickel from said precipitate.

7. A process for the separation of iron impurity from acidic aqueous solutions of cobalt salts containing iron at least in part in divalent form, which comprises heating the solution to a temperature of from 170°–200° F., adding cobaltic pentammine to said solution in a quantity substantially equivalent to the divalent iron content of the solution, maintaining the pH value of the solution within the range of 3.5 to 5, and when the iron content has been substantially wholly precipitated, separating the remaining solution containing the cobalt from said precipitate.

8. A process for the separation of iron impurity from cobalt-bearing acidic, aqueous product leach liquor solutions containing iron at least in part in divalent form, which comprises heating the solution to a temperature of about 185° F., adding cobaltic pentammine to said solution in a quantity substantially equivalent to the divalent iron content of the solution, adjusting the hydrogen ion concentration of the solution by the addition of an alkali to a pH value of from 3.5 to 5, and when the iron content has been substantially wholly precipitated, separating the remaining solution containing the cobalt from said precipitate.

9. A process for the separation of iron impurity from cobalt-bearing acidic aqueous product leach liquor solutions, containing iron at least in part in divalent form, which comprises heating the solution to a temperature of at least about 170° F., adding cobaltic pentammine to said solution in a quantity substantially equivalent to the divalent iron content of the solution, maintaining the pH value of the solution at about 4, until the pentammine has reacted with the ferrous iron and the iron impurity has been precipitated.

10. A process for the separation of iron impurity from a product liquor solution obtained in a process involving the sulfuric acid leaching of cobalt- and nickel-containing lateritic, limonite ore, which comprises heating the solution to a temperature of about 185° F., adding cobaltic pentammine to said solution in a quantity substantially equivalent to the divalent iron content of the solution, adjusting the hydrogen ion concentration of the solution by the periodic addition of ammonia, to a pH value of about 4, thereby accomplishing the oxidation of the divalent iron content and its precipitation, and when the iron content has been substantially wholly precipitated, separating the remaining solution containing the cobalt and the nickel from said precipitate.

References Cited in the file of this patent
UNITED STATES PATENTS

| | | |
|---|---|---|
| 2,647,828 | McGauley | Aug. 4, 1953 |
| 2,694,006 | Schaufelberger et al. | Nov. 9, 1954 |
| 2,786,751 | Roy et al. | Mar. 26, 1957 |